Oct. 16, 1951  L. A. ULMSCHNEIDER ET AL  2,571,796
FILM CASSETTE
Filed Oct. 1, 1949
FIG. 1.   PRIOR ART   FIG. 2.
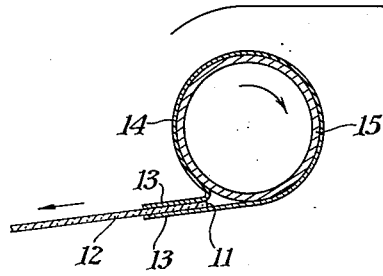
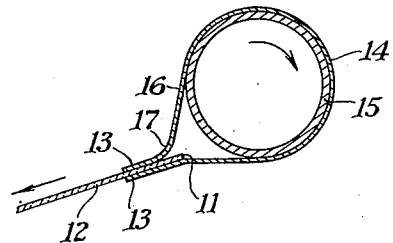
FIG. 3.
FIG. 4.
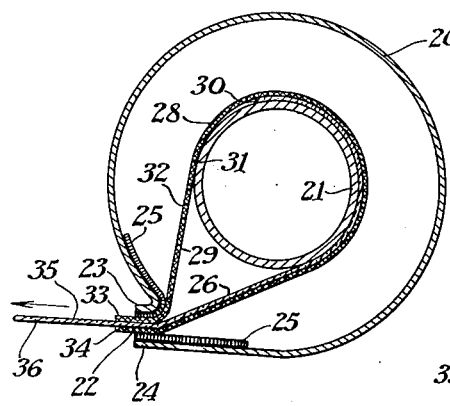
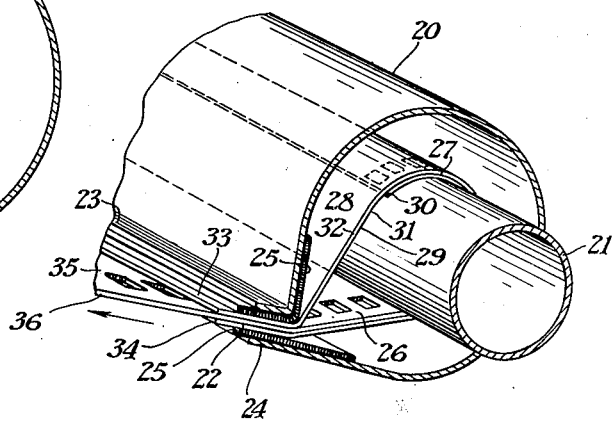
LAWRENCE A. ULMSCHNEIDER
CHARLES W. LEWIS
INVENTORS
BY
ATTORNEYS Patented Oct. 16, 1951

2,571,796

UNITED STATES PATENT OFFICE 2,571,796

FILM CASSETTE

Lawrence A. Ulmschneider and Charles W. Lewis, Rochester, N. Y., assignors to Eastman Kodak Company, Rochester, N. Y., a corporation of New Jersey Application October 1, 1949, Serial No. 119,150

7 Claims. (Cl. 242—71)

The present invention relates to photography, and more particularly to film cassettes.

As is well known, a film cassette comprises a light tight tubular casing in which is mounted, for rotation, a film spool on the core of which the unexposed film strip is wound. The leading end of the strip extends through and projects from a film exit guide or passage formed in the casing. This guide is provided with lips through which the film strip may be drawn; and, in order to protect the film in the casing against light fog, the lips are lined with a suitable light-excluding material, such, for example, as velvet strips.

The camera is loaded by placing the cassette in one end thereof, and drawing out the leader strip and passing it over the exposure frame and then connecting it to a take-up spool at the other end of the camera. After each exposure is made, the wind-up knob is rotated to wind up the exposed film area onto the take-up spool, and to bring a new unexposed film area into exposing position. After the last exposure has been made, the entire exposed film is rewound back onto the spool in the cassette, all of which is well known to users of such devices. However, in order that the exposed film may be rewound back into the cassette, it is common practice to secure the trailing end of the film to the film spool in the cassette.

It has been found, however, that unless a counter is used, or some record is kept of the exposures made, the operator cannot determine definitely just when the end of the exposure section of the film strip has been reached. The result is that any attempt to further advance the film beyond this point may tend, and often does, break or disengage the securing means for the trailing end of the strip so that the latter is disengaged from the supply spool and may be withdrawn completely from the cassette and partially or wholly wound up on the take-up spool. As the exposed film wound on the take-up spool is not protected from light fog by a suitable length trailing strip, the exposed roll cannot be removed safely in daylight and replaced by a new cassette. The result is that the operator must wait until he reaches a suitable darkroom before unloading the camera and rewinding the exposed film back into the cassette. In the meantime, many desirable pictures may be lost. This not only causes a loss of film sales for the manufacturer; but is, to say the least, also very annoying to the user as some irreplaceable shots may be lost.

The present invention has, as its principal object, the provision of a new and improved anchoring means for securing the end of the film to the spool in the cassette.

A further object of the invention is the provision of an anchoring means which prevents disengagement of the film end from the supply spool in the cassette while the film is in the camera so as to insure that the exposed film may be rewound in the cassette.

A still further object of the invention is the provision of a film-attaching or anchoring means which is simple in construction, easy and inexpensive to manufacture, and highly effective in use.

To these and other ends, the invention resides in certain improvements and combinations of parts, all as will be hereinafter more fully described, the novel features being pointed out in the claims at the end of the specification.

In the drawings:

Fig. 1 is an end view of a prior form of film attaching means, showing the relation of the parts near the end of the film unwinding operation;

Fig. 2 is a view similar to Fig. 1, but showing the relation of the parts after the film has been unwound a distance slightly greater than that shown in Fig. 1, illustrating the peeling-off of the holding tape from the film;

Fig. 3 is a transverse sectional view through a film cassette, showing the relation thereto of a film anchoring means constructed in accordance with the present invention; and Fig. 4 is a perspective view of the arrangement shown in Fig. 3 with an end cap of the cassette removed and the film spool partly drawn out so as to show the relation of the parts.

Similar reference numerals throughout the various views indicate the same parts.

Where it is desired to rewind an exposed film back onto the supply spool while the strip is in the camera, it has been common practice to provide means for securing or attaching the trailing end of the strip to the core of the supply spool. Figs. 1 and 2 show one form of such anchoring means used prior to the present invention. This form of securing means is typical of a large number of such devices which differ from each other only in minor structural details. With such an arrangement, the trailing end 11 of a film strip 12 is adhesively secured, in sandwich relation, between the ends 13 of a retaining strip or tape 14 which is wrapped around and usually adhesively secured to the core 15 of a supply spool. The latter is ordinarily provided with end flanges for axially positioning the film strip; but, for the purpose of clarity, these end flanges have been omitted in the drawings. As the film is unwound, the core 15 is rotated in a clockwise direction, as indicated by the arrows, to withdraw the film from the core, as is apparent. Near the end of the unwinding operation, the parts are in the position shown in Fig. 1 with the tape 14 secured to the core '5 for the substantial periphery thereof. When, however, the film strip 12 is pulled further, the upper portion 16 of the tape 14 first pulls or strips off the spool core 15 and then starts to peel off the surface of the film, as shown at 17. It will be readily apparent that the adhesive layers, not shown, which connect the ends 13 of the tape 14 adhesively to the opposite faces of the film strip are in direct shear, and it is the shear alone which determines the maximum amount of pull which can be applied to the film strip without disconnecting the latter from its holding tape. If such disconnection occurs, further pull on the film will serve to rotate the spool further and unwind the trailing end of the film, as well as the tape 14, to disconnect the film completely from the spool, the disadvantages of which have been pointed out above.

In order to prevent such disconnection of the film from the take-up spool, the present invention provides a new, improved and simple anchoring means which effectively prevents disengagement of the film from its holding spool. The anchoring means is used in connection with a cassette formed to provide a cylindrical casing 20, the ends of which are closed, in a light-tight relation, with suitable end caps, not shown. The casing 20 has mounted for rotation therein a film spool, the core 21 of which carries the unexposed film strip. The film spool is provided with end flanges; but, for the purpose of clarity, these flanges have been omitted in the drawings. The casing 20 is formed with a substantially tangentially arranged film exit guide or passage 22 having oppositely arranged lips 23 and 24 which are lined with a suitable light-excluding material 25. The cassette construction so far described is of a standard design and forms no part of the present invention. The latter relates exclusively to the anchoring arrangement for the trailing portion of the film strip.

In the present invention the end of the film does not terminate at the exit guide 22, as in prior construction; but, on the contrary, extends into the casing 20 and is wrapped or snubbed on the spool core 21. The result is that when the film is completely unwound, the trailing portion of the film has an inclined part 26 which extends from the exit guide 22 towards the spool and a part 27 which is wrapped or snubbed around the spool core 21, as clearly illustrated in Figs. 3 and 4. A holding and retaining tape 28, having an adhesively coated surface 29, overlies and is adhesively secured to the outer surfaces of parts 26 and 27 of the film strip. The tape is also wrapped around the core 21; and, beyond the trailing end 30, is adhesively secured directly to the spool core, as shown at 31. The tape then extends in an inclined relation, as shown at 32, to the film exit guide 22. The ends 33 and 34 of the tape extend through and preferably slightly beyond the exit passage or guide 22, and are secured adhesively to the opposite surfaces 35 and 36 respectively of the film strip in and adjacent the guide 22, as clearly illustrated in Figs. 3 and 4. Thus, the film strip is snubbed to the spool core 21, and the tape 28 is secured to the film not only at the guide 22 but also to the parts 26 and 27 as well as to the core at 31. By means of this arrangement, an increased holding power is provided between the tape and film as well as between the latter and the spool core.

Referring now to Fig. 3, it is apparent that if a pull or force is applied to the portion of the film outside the cassette and in the direction of the arrow, this force may be resolved into two forces, one acting in an inclined direction along part 26 of the film, and a second force acting at right angles to part 26 and through a point in the passage 22. This second force serves to hold the film and the end 33 of the tape securely against the upper lip 23 of the casing with sufficient force to prevent the stripping or disengagement of the end 33 from the surface 35 of the film. The result is that the tape 28 will be held securely in a holding relation with the film, and will prevent disengagement of the film from its core, the advantages of which are obvious.

The holding relation is most effective when the exit guide 22 is arranged tangentially relative to the spool core so as to provide an inclined portion or part 26 of the film therebetween, because then a component of the pulling force on the film acts to hold the film and tape end 33 against lip 23 to prevent disengagement of the end 33 from the film. However, due to the snubbing effect of the film on the core, and the additional area of adhesion of the tape and film due to the provision of the parts 26 and 27, the structure shown is effective even with a non-tangentially arranged passage 22. It has been found that, after extensive tests, that the holding arrangement illustrated in Figs. 1 and 2 often fails even when a high grade adhesive is used, while no failures occurred with the arrangement of the present invention even when lower grade adhesives were employed. The structure of the present invention thus provides a stronger and more effective means for anchoring the end of the film strip to the spool core in the cassette. The result is that the film will not become detached from the spool.

It is apparent that even a small amount of snubbing of the film part 27 around the core 21 will increase the holding power over the prior structures; yet, in the preferred arrangement, the film is snubbed approximately 180° on the core. With this arrangement, a substantially 90° arc of contact is provided for securing the tape to the core at 31. The angle of wrap is not, however, critical and may be varied somewhat without affecting materially the holding power of the anchoring arrangement. The important thing is that the snubbed film cooperates with the increased adhesive connection, and the addition of the holding or pressure force of the film and tape against the lip 23 to prevent the stripping or pulling of the tape from the film. Thus, the present invention provides a new, improved and simple anchoring means for the trailing end of the film to prevent disengagement of the latter from the film core. The result is that the unexposed film can always be rewound back into the cassette and the latter removed and replaced by a new cassette ready for use so that no desired pictures will be lost, the advantages of which are apparent.

While one embodiment of the invention has been disclosed, it is to be understood that the inventive idea may be carried out in a number of ways. This application is, therefore, not to be limited to the precise details disclosed, but is intended to cover all variations and modifications thereof falling within the scope of the appended claims.

We claim:

1. In a film cassette, the combination with a lighttight tubular casing formed with a slotted film-exit guide having spaced lips lined with a light-excluding material, a film spool rotatably mounted in said casing and formed with a core on which a film strip is wound, of means for anchoring the trailing end of said strip to said core, said means comprising a trailing portion formed on said strip and positioned between and extending inwardly from said lips and snubbed on said core, a tape wrapped around said core and overlying said portion to retain the latter in engagement with said core, and sections of said tape extending from said core and projecting through said guide and adhesively secured to opposite sides of said strip between said lips so that any pull on the part of the strip outside said cassette will cause said lips to press on the sections positioned therebetween to prevent disengagement of the tape from said portion.

2. In a film cassette, the combination with a lighttight tubular casing formed with a slotted film-exit guide having spaced lips lined with a light-excluding material, a film spool rotatably mounted in said casing and formed with a core on which a film strip is wound, of means for anchoring the trailing end of said strip to said core, said means comprising a trailing portion formed on said strip and positioned between and extending inwardly from said lips and having the end thereof snubbed to said core, a tape wrapped around said core and having a section thereof overlying said snubbed portion to retain the latter in snubbing relation with said core, another section of said tape extending beyond said portion and secured adhesively to said core, and ends of said tape positioned in said guide and engaged by said lips and secured adhesively to the opposite sides of said film in said guide so that any pull on said strip outside of said cassette will cause said lips to cooperate with said tape and said snubbed portion to prevent disengagement of said tape from said portion.

3. In a film cassette, the combination with a light-tight tubular casing formed with a slotted film-exit guide having spaced lips lined with a light-excluding material, a film spool rotatably mounted in said casing and formed with a core on which a film strip is wound, of means for anchoring the trailing end of said strip to said core, said means comprising a trailing portion formed on said strip and positioned between and extending inwardly from said lips and having the end thereof snubbed to said core, a tape wrapped around said core and having a section thereof overlying said portion for the full length thereof and terminating in an end positioned in said guide, said section being secured adhesively to one side of said portion for the full length thereof, said tape terminating in another end positioned in said guide and overlying and adhesively secured to the other side of said portion in said guide so that any pull on said strip outside said cassette will cause said lips to be pressed on said tape in said guide to prevent disengagement thereof from said portion.

4. In a film cassette, the combination with a light-tight tubular casing formed with a slotted film-exit guide having spaced lips lined with a light-excluding material, a film spool rotatably mounted in said casing and formed with a core on which a film strip is wound, of means for anchoring the trailing end of said strip to said core, said means comprising a trailing portion formed on said strip and positioned between and extending inwardly from said lips and having the end thereof snubbed to said core, a tape wrapped around said core and having a section thereof overlying said portion for the full length thereof and terminating in an end positioned in said guide, said section being secured adhesively to one side of said portion for the full length thereof, a second section of said tape extending beyond the snubbed end of said portion and adhesively secured to said core, and an end formed on said section position in said guide and secured adhesively to the other side of said portion in said guide so that any pull on said strip outside said cassette will cause said lips to press said tape ends against the opposite sides of said portion with sufficient force to prevent the disengagement of said tape from said portion.

5. In a film cassette, the combination with a light-tight tubular casing formed with a slotted film-exit guide having spaced lips lined with a light-excluding material, a film spool rotatably mounted in said casing and formed with a core on which a film strip is wound, of means for anchoring the trailing end of said strip to said core, said means comprising a trailing portion formed on said strip and having a part positioned in said guide, a second part extending from said guide to said core, and a third part wrapped substantially half way around said core to snub said portion to said core, a tape wrapped around said core and having a section overlying and secured adhesively to said parts, a second section on said tape extending beyond said third part and adhesively secured to said core therebeyond, and an end formed on said section positioned in said guide and secured adhesively to the side of said portion in said guide opposite said first section so that any pull on the strip outside said cassette will cause said lips to act on the areas of the tape in said guide to press the tape tightly against the portion in said guide to prevent disengagement of the tape from said portion.

6. In a film cassette, the combination with a light-tight tubular casing formed with a straight planar film exit guide having spaced lips lined with a light excluding material, a film spool rotatably mounted in said casing and formed with a core on which a film strip is wound, of means for anchoring a trailing portion of said strip to said core, said means comprising a part of said portion snubbed to said core, a second part extending from said first part to said guide and inclined to the plane of the latter, a tape wrapped around said core and overlying said parts, and ends of said tape positioned in said guide and adhesively secured to opposite sides of a film positioned therein, said guide being positioned out of the plane of said second part so that a pull on a portion of the film strip outside said casing will provide a force which is normal to said second part and which causes said lips to engage said ends to retain the latter in holding relation with said strip.

7. In a film cassette, the combination with a light-tight tubular casing formed with a straight planar film exit guide having spaced lips lined with a light excluding material, a film spool rotatably mounted in said casing and formed with a core on which a film strip is wound, of means for anchoring a trailing portion of said strip to said core, said means comprising a part of said portion snubbed to said core, a second part extending from said first part to and through said guide and inclined to the plane of the latter, a tape wrapped around said core and overlying said parts, and ends of said tape positioned in said guide and adhesively secured to opposite sides of a film area positioned therein, said guide being arranged substantially tangentially of said casing and having the plane thereof positioned out of the plane of the axis of said spool so as to position said second part in an inclined relation to said guide so that a pull on the strip outside said casing will provide a force which is normal to said second part so as to cause said lips to press on said ends with sufficient force to prevent disengagement of said tape from the strip.

LAWRENCE A. ULMSCHNEIDER.
CHARLES W. LEWIS.

REFERENCES CITED

The following references are of record in the file of this patent:

UNITED STATES PATENTS

| Number | Name | Date |
|---|---|---|
| 1,003,593 | Gammeter | Sept. 9, 1911 |
| 1,966,347 | Hughey | July 10, 1934 |
| 2,303,173 | Roehrl | Nov. 24, 1942 |

FOREIGN PATENTS

| Number | Country | Date |
|---|---|---|
| 780,118 | France | Jan. 24, 1935 |